US009499006B2

(12) United States Patent
Liang et al.

(10) Patent No.: US 9,499,006 B2
(45) Date of Patent: Nov. 22, 2016

(54) ANTI-COUNTERFEITING FEATURE GENERATION METHOD FOR VALUABLE DOCUMENT AND AUTHENTICATION METHOD AND DEVICE THEREFOR

(71) Applicant: GRG Banking Equipment Co., Ltd., Guangzhou, Guangdong (CN)

(72) Inventors: Tiancai Liang, Guangzhou (CN); Yuanchao Yu, Guangzhou (CN); Weifeng Wang, Guangzhou (CN); Xiaoliang Wang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/426,949

(22) PCT Filed: Mar. 19, 2013

(86) PCT No.: PCT/CN2013/072849
§ 371 (c)(1),
(2) Date: Mar. 9, 2015

(87) PCT Pub. No.: WO2014/048091
PCT Pub. Date: Apr. 3, 2014

(65) Prior Publication Data

US 2015/0217591 A1 Aug. 6, 2015

(30) Foreign Application Priority Data

Sep. 29, 2012 (CN) .......................... 2012 1 0376658

(51) Int. Cl.
*G06K 7/00* (2006.01)
*B42D 25/30* (2014.01)
(Continued)

(52) U.S. Cl.
CPC ............. *B42D 25/30* (2014.10); *B42D 25/405* (2014.10); *G07D 7/00* (2013.01); *G07D 7/2058* (2013.01)

(58) Field of Classification Search
USPC .................. 235/375, 379, 380; 705/5, 35–45
See application file for complete search history.

(56) References Cited

U.S. PATENT DOCUMENTS 8,064,102 B1 11/2011 Zhao et al.
2002/0009208 A1 1/2002 Alattar et al.
(Continued)

FOREIGN PATENT DOCUMENTS

CN 1669046 A 9/2005
CN 101504781 A 8/2009
CN 101553761 A 10/2009
CN 102568079 A 7/2012
(Continued)

OTHER PUBLICATIONS

Extended European Search Report from corresponding European Application No. EP 13 84 1494 dated Aug. 4, 2015.
(Continued)

*Primary Examiner* — Matthew Mikels
(74) *Attorney, Agent, or Firm* — Wolf, Greenfield & Sacks, P.C.

(57) ABSTRACT

An anti-counterfeiting feature generation method for a valuable document and an authentication method and device therefor. The anti-counterfeiting feature generation method for a valuable document uses the anti-counterfeiting feature information redundancy to hide accurate information about an anti-counterfeiting feature. In the generation method, the anti-counterfeiting feature of a valuable document has little change on the human perception, but a valuable document authentication device in a financial self-service equipment can effectively extract the hidden accurate information about an anti-counterfeiting feature from signals obtained by a sensor and conduct quantitative detection and authentication, thereby effectively authenticating whether the valuable document is counterfeit or not. A new anti-counterfeiting feature which facilitates machine recognition is loaded to the valuable document, and a corresponding valuable document authentication device is configured to a financial self-service equipment, so that the financial self-service equipment can read the anti-counterfeiting feature of the valuable document by facilitating machine recognition, thereby improving the authentication accuracy of the financial self-service equipment to the valuable document.

3 Claims, 5 Drawing Sheets

(51) Int. Cl.

| | |
|---|---|
| ***G07D 7/00*** | (2016.01) |
| ***G07D 7/20*** | (2016.01) |
| ***B42D 25/405*** | (2014.01) |

(56) References Cited

U.S. PATENT DOCUMENTS

| | | | | |
|---|---|---|---|---|
| 2008/0159615 | A1 | 7/2008 | Rudaz et al. | |
| 2010/0188709 | A1* | 7/2010 | Simske .................... | G09C 5/00 358/3.28 |
| 2011/0248827 | A1* | 10/2011 | Bertoncini ............ | H04W 12/06 340/10.1 |

FOREIGN PATENT DOCUMENTS

| | | | |
|---|---|---|---|
| CN | 202373062 | U | 8/2012 |
| CN | 202383766 | U | 8/2012 |
| JP | 2011238056 | A | 11/2011 |
| WO | WO 2007/105891 | A1 | 9/2007 |
| WO | WO 2007105890 | A | 9/2007 |

OTHER PUBLICATIONS

International Search Report dated Jul. 11, 2013 from corresponding International Application No. PCT/CN2013/072849.

* cited by examiner

ANTI-COUNTERFEITING FEATURE GENERATION METHOD FOR VALUABLE DOCUMENT AND AUTHENTICATION METHOD AND DEVICE THEREFOR

This application is the US national phase of International Application No. PCT/CN2013/072849 filed on Mar. 19, 2013, which claims the priority of Chinese Patent Application No. 201210376658.3, entitled "METHOD FOR GENERATING ANTI-COUNTERFEITING FEATURE FOR VALUABLE DOCUMENT, AND METHOD AND APPARATUS FOR IDENTIFYING VALUABLE DOCUMENT", filed on Sep. 29, 2012 with State Intellectual Property Office of PRC, which applications are hereby incorporated by reference to the maximum extent allowable by law.

FIELD OF THE INVENTION

The present invention relates to valuable document anti-counterfeiting technique, and in particular to a method for generating an anti-counterfeiting feature for a valuable document and a method and an apparatus for identifying the valuable document.

BACKGROUND OF THE INVENTION

With the fast development of the social economy, currency circulation and requirement for automatic currency processing devices are increasing sharply. Automatic currency processing devices are widely applied in the fields and businesses such as bank, currency sorting center, currency escorting agency, super market, large gas station and retail shopping center.

The anti-counterfeiting feature of a valuable document such as banknote is mainly designed for easy distinguishing and identification by human. For example, the anti-counterfeiting feature of banknotes is designed within a perceptual capability range of human sense including tactile sense, visual sense, auditory sense and the like. And in most anti-counterfeiting designs for the banknotes, the convenience for a machine to acquire the anti-counterfeiting feature of the banknotes has not been considered.

From the view point of signal processing, in the existing methods for discriminating a valuable document based on human perception, only human perceivable contents in the signal, which only constitute minority of the signal, are used, while the rest contents as the majority of the signal are omitted as redundancy. Additionally, as the anti-counterfeiting feature for the banknotes is not designed specially for machine-reading, when a true property of banknotes is identified by a valuable document recognizing system in the automatic currency processing device, only information useable for valuable document recognition is acquired by a sensor in the automatic currency processing device scanning the valuable document. For example, when scanning a number showing a denomination printed in optically variable ink on a 100 denomination banknote of a certain currency type using an optical sensor, image data acquired by the sensor is incapable of reflecting the optical variability serving as the anti-counterfeiting feature. Therefore, processing for the number showing the denomination printed in optically variable ink on the 100 denomination banknote of the currency type only stays on a level of recognizing and can not realize an effect of counterfeit-identifying.

With continuous improvements of technique for forging notes by criminals, the spliced or altered banknotes are quite convincing, even mistakable for the real banknotes, and the forged notes circulating in the society brings enormous challenges to automatic currency processing businesses, affects the social economic order and threatens the national finance security seriously. If the anti-counterfeiting feature of the banknotes can not be used by a machine efficiently and the anti-counterfeiting feature of the banknotes can only be recognized but can not contribute to the accurate counterfeit-identification, the existing financial self-service devices would be put in a passive position by various forged notes and the national finance order and the social harmony and stability would be faced with severe challenges.

Disadvantages in the existing banknote counterfeit-identifying technologies are as follows: the financial self-service device can not read an essential anti-counterfeiting characteristic of the anti-counterfeiting feature on the banknote and does not take full advantage of counterfeit-identifying information of the banknote, thus counterfeit-identifying capability of the financial self-service device is weak.

SUMMARY OF THE INVENTION

One object of the present invention is to provide a method for generating an anti-counterfeiting feature for a valuable document, which enables a financial self-service device to read the anti-counterfeiting feature for the valuable document and improves the capability of the financial self-service device for identifying the valuable document.

Another object of the present invention is to provide a method for identifying a valuable document, which enables a financial self-service device to read an essential anti-counterfeiting feature of the valuable document and improves the performance of the financial self-service device for identifying the valuable document.

A further object of the present invention is to provide an apparatus for identifying a valuable document, which is applied in a financial self-service device, enables the financial self-service device to read an essential anti-counterfeiting feature of the valuable document, and improves the performance of the financial self-service device for identifying the valuable document.

The method for generating an anti-counterfeiting feature for a valuable document including: step one, scanning an original anti-counterfeiting feature M on the valuable document by a sensor, to obtain $M_1$ composed of partial information $M_{10}$ sensitive for human perception and partial information $M_{11}$ insensitive for human perception, and setting $M_2$ to denote accurate anti-counterfeiting characteristic information of the anti-counterfeiting feature M that is not obtainable by the sensor, $M_2$ being composed of partial information $M_{20}$ sensitive for human perception and partial information $M_{21}$ insensitive for human perception; step two, performing an invertible transform T on each of $M_1$ and $M_2$, so as to separate the partial information $M_1$ sensitive for human perception and the partial information $M_2$ insensitive for human perception: $T(M_1)=[M_{10}, M_{11}]$, $T(M_2)=[M_{20}, M_{21}]$; step three, arranging a signal model $M_0=[M_{10}, M_{20}]$, and performing an inverse of the invertible transform T on $M_0$: $T'(M_0)$, $T'(M_{10}, M_{20})$; an step our, adding the $T'(M_0)$ onto the valuable document to generate the anti-counterfeiting feature.

Preferably, the invertible transform T is a wavelet transform.

Preferably, in step one, M is an image of a number in optically variable ink showing a denomination, $M_1$ is a pixel matrix $f_1(x, y)$ in the spatial domain representing the image of the number showing the denomination printed in optically variable ink as perceived by a human eye when the valuable document is viewed at a right angle, and $M_2$ is a pixel matrix $f_2(x, y)$ in the spatial domain representing the image of the number showing the face value printed in optically variable ink as perceived by the human eye when the valuable document is viewed at a non-right angle; in step two, a wavelet transform W is performed on the pixel matrixes for frequency-domain transform: $W[f_1]=R_1$, $W[f_2]=R_2$, where $$R_1 = \begin{bmatrix} H_1H_1 & H_1L_1 \\ H_1L_1 & L_1L_1 \end{bmatrix} \text{ and } R_2 = \begin{bmatrix} H_2H_2 & H_2L_2 \\ H_2L_2 & L_2L_2 \end{bmatrix},$$

$R_1$ and $R_2$ represent frequency-domain coefficient matrixes obtained from the wavelet transform on $f_1(x, y)$ and $f_2(x, y)$ respectively, $H_1H_1$ in $R_1$ represents a highest-frequency coefficient and $L_2L_2$ in $R_2$ represents a lowest-frequency coefficient; in step three, $L_2L_2$ in $R_2$ substitute for $H_1H_1$ in $R_1$, and the following equation is obtained:

$$R_1' = \begin{bmatrix} L_2L_2 & H_1L_1 \\ H_1L_1 & L_1L_1 \end{bmatrix} \quad \text{(Equation 1)}$$

an inverse M of the wavelet transform W is performed on $$R_1': M_R = M(R_1') = M\left(\begin{bmatrix} L_2L_2 & H_1L_1 \\ H_1L_1 & L_1L_1 \end{bmatrix}\right),$$

so as to inverse a wavelet coefficient matrix $R_1'$ in the frequency domain to a pixel matrix $M_R$ in the spatial domain; and in step four, the pixel matrix $M_R$ in the spatial domain is added onto the valuable document.

The method for identifying a valuable document provided in the present invention includes: step one, inputting the valuable document to be identified, which starts the process; step two, acquiring image information of the valuable document to be identified by a sensor; step three, pre-processing the image information and acquiring general information of an anti-counterfeiting feature; step four, performing a template matching between the general information of the anti-counterfeiting feature and standard data stored in a storage unit, and if template matching is successful, proceeding to step five; if template matching fails, determining the valuable document to be identified as an illegal valuable document; and step five, extracting a hidden anti-counterfeiting characteristic and performing accurate identification on the anti-counterfeiting feature in the frequency domain, wherein a wavelet transform the same as that used in generating of the anti-counterfeiting feature is performed on $f_3(x, y)$, where $f_3(x, y)$ represents a pixel matrix in the spatial domain of an image of a number in a region of the anti-counterfeiting feature, and $W[f_3]=R_3$, and the following equation is obtained:

$$R_3 = \begin{bmatrix} H_3H_3 & H_3L_3 \\ H_3L_3 & L_3L_3 \end{bmatrix} \quad \text{(Equation 2)}$$

According to the method for generating an anti-counterfeiting feature for a valuable document, coefficients contained in the coefficient matrix $H_3H_3$ in Equation 2 present a strong similarity to those coefficients contained in the coefficient matrix $L_2L_2$ in Equation 1, the coefficients contained in $H_3H_3$ are arranged as a one-dimensional data sequence: $h=[h_1, h_2, \ldots, h_n]$ and the coefficients contained in $L_2L_2$ are arranged as a one-dimensional data sequence: $l=[l_1, l_2, \ldots, l_n]$; similarity K1 between the data sequences $h=[h_1, h_2, \ldots, h_n]$ and $l=[l_1, l_2, \ldots, l_n]$ is detected based on a similarity determining criterion, and if K1 is greater than a predetermined threshold K, the valuable document is identified to be real; otherwise, the valuable document is identified to be false and is rejected.

Preferably, the similarity determining criterion used in step five is a correlation coefficient method.

Preferably, the predetermined threshold K in step five is less than 1 and greater than or equal to 0.8.

An apparatus for identifying a valuable document is further provided in the present invention, including: a sensor adapted to acquire image information of the valuable document to be identified; a signal pre-processing unit adapted to preprocess the image information, acquire general information of an anti-counterfeiting feature, and prepare for hidden information extraction and accurate counterfeit-identifying; a storage unit adapted to store standard data for the general information and hidden information of the anti-counterfeiting feature needed for identifying the valuable document; a hidden information acquiring unit adapted to perform transforms on preprocessed information so as to extract the hidden information; and a counterfeit-identifying unit adapted to compare the hidden information and the general information with respective standard data and outputs an identified result.

In the present invention, it is proposed a processing manner in which accurate information of an anti-counterfeiting feature is hidden by using information redundancy of the anti-counterfeiting feature. In the processing manner, there is scarcely any change in the anti-counterfeiting feature for the valuable document in human perception, while the apparatus for identifying the valuable document in a financial self-service device is capable of efficiently extracting the hidden accurate information of the anti-counterfeiting feature from the signal acquired by the sensor and performing quantitative detection and identification, thereby the valuable document is identified to be real or false efficiently. That is to say, by adding a new anti-counterfeiting feature, which is convenient for a machine to recognize, onto the valuable document and providing a corresponding apparatus for identifying a valuable document in the financial self-service device, the financial self-service device is enabled to read the anti-counterfeiting feature which is convenient for the machine to recognize and thus the identifying precision of the financial self-service device for the valuable document is improved.

DETAILED DESCRIPTION OF THE INVENTION

The technical solutions according to embodiments of the present invention will be described clearly and completely as follows in conjunction with the accompany drawings in the embodiments of the present invention. It is obvious that the described embodiments are only some of rather than all of the embodiments according to the present invention. Any other embodiments obtained by those skilled in the art based on the embodiments in the present invention without any creative work fall in the scope of the present invention.

Figure 1:
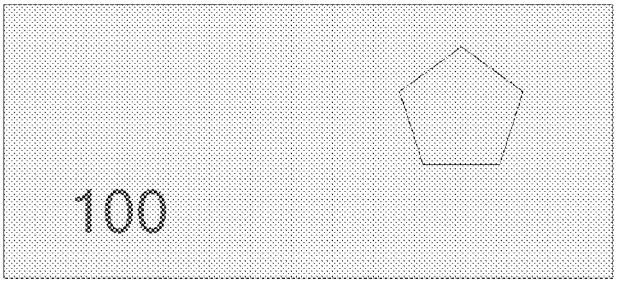
FIG. 1 is image information of a 100 denomination banknote of a certain currency type.
Figure 2:
FIG. 2 is a diagram of a number in optically variable ink showing a denomination of the 100 denomination banknote of the currency type when viewed at a right angle, which is in green.

For the purpose of illustrating the application of the present invention, in an embodiment according to the present invention, a 100 denomination banknote of a certain currency type as illustrated in FIG. 1 is taken as an object to be identified and a number in optically variable ink showing a denomination as an anti-counterfeiting feature of the 100 denomination banknote of the currency type as illustrated in FIG. 2 is taken as an object to be processed.

First Section: A Method for Generating an Anti-Counterfeiting Feature for a Valuable Document.

The anti-counterfeiting feature in FIG. 2 is a number in optically variable ink showing a denomination on the 100 denomination banknote of the currency type when viewed at a right angle, which is in green. When the anti-counterfeiting feature is inclined, an optical variation may occur and the feature is viewed as in light cyan, as illustrated in FIG. 3.

Given a 100 denomination banknote of the currency type manufactured in existing manner and a banknote processing device with the existing configuration for the sensor, it is impossible for a machine to perform an accurate detection and identification on such an optical variablity of the number in optically variable ink showing a denomination. In order to enable a banknote recognizing system to accurately detect and identify the optical variability of the number in optically variable ink showing a denomination, when a banknote is recognized, by setting a pixel matrix $f_1(x, y)$ in the spatial domain representing the image (as shown in FIG. 2) of the number in optically variable ink showing the denomination captured by the optical sensor and a pixel matrix $f_2(x, y)$ in the spatial domain representing the image (as shown in FIG. 3) of the number in optically variable ink showing the denomination perceived when the banknote is viewed at a non-right angel, the following processing is performed:

I. Performing Frequency Domain Transform

Figure 3:
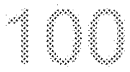
FIG. 3 is a diagram of the number showing the denomination printed in optically variable ink of the 100 denomination banknote of the currency type when viewed at a non-right angle, which is in light cyan.

The representations in the spatial domain of FIG. 2 and FIG. 3 are transformed into representations in the frequency domain. In the embodiment, a wavelet transform W is preferably used to perform the frequency-domain transform on the pixel matrixes in the spatial domain for the images in FIG. 2 and FIG. 3. Setting:

$$W[f_1]=R_1$$

$$W[f_2]=R_2$$

where $$R_1 = \begin{bmatrix} H_1H_1 & H_1L_1 \\ H_1L_1 & L_1L_1 \end{bmatrix} \text{ and } R_2 = \begin{bmatrix} H_2H_2 & H_2L_2 \\ H_2L_2 & L_2L_2 \end{bmatrix},$$

$R_1$ and $R_2$ represent frequency-domain coefficient matrixes obtained from the wavelet transform on the pixel matrixes in the spatial domain for the images in FIG. 2 and FIG. 3 respectively. $H_1H_1$ in $R_1$ represents a highest-frequency coefficient and $L_2L_2$ in $R_2$ represents a lowest-frequency coefficient. According to the property of the wavelet transform, energy for the image in FIG. 2 is mainly concentrated at the low frequency part $L_1L_1$ and energy for the image in FIG. 3 is mainly concentrated at the low frequency part $L_2L_2$.

II. Hiding Processing and Generating a New Anti-Counterfeiting Feature

By substituting $L_2L_2$ in $R_2$ for $H_1H_1$ in $R_1$, the following equation is obtained $$R_1' = \begin{bmatrix} L_2L_2 & H_1L_1 \\ H_1L_1 & L_1L_1 \end{bmatrix} \quad \text{(Equation 1)}$$

Figure 4:
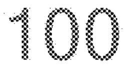
FIG. 4 illustrates a number in optically variable ink showing a denomination as the anti-counterfeiting feature provided according to an embodiment of the present invention.

An inverse M of the wavelet transform W is performed on $R_1'$:

$$M_R = M(R_1') = M\left(\begin{bmatrix} L_2L_2 & H_1L_1 \\ H_1L_1 & L_1L_1 \end{bmatrix}\right),$$

the wavelet coefficient matrix $R_1'$ in the frequency domain is inversed to a pixel matrix $M_R$ in the spatial domain. For the perception of the human eye, there is substantially no difference between the image of FIG. 4 represented by $M_R$ in the spatial domain and the image of the FIG. 2. The image in FIG. 4 is the newly generated anti-counterfeiting feature.

Figure 5:
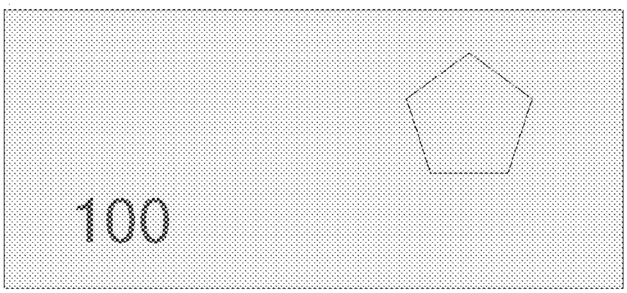
FIG. 5 illustrates a 100 denomination banknote of the currency type being added with the number showing the denomination printed in optically variable ink as the anti-counterfeiting feature, as shown in FIG. 4.

III. adding the new anti-counterfeiting feature, in which the image of FIG. 4 is added onto the 100 denomination banknote of the currency type as illustrated in FIG. 5.

The anti-counterfeiting feature for the valuable document generated according to the above method is easy to be read by a financial self-service device, so that the capability of the financial self-service device for identifying the valuable document is improved.

Second Section: A Method for Identifying a Valuable Document.

Figure 7:
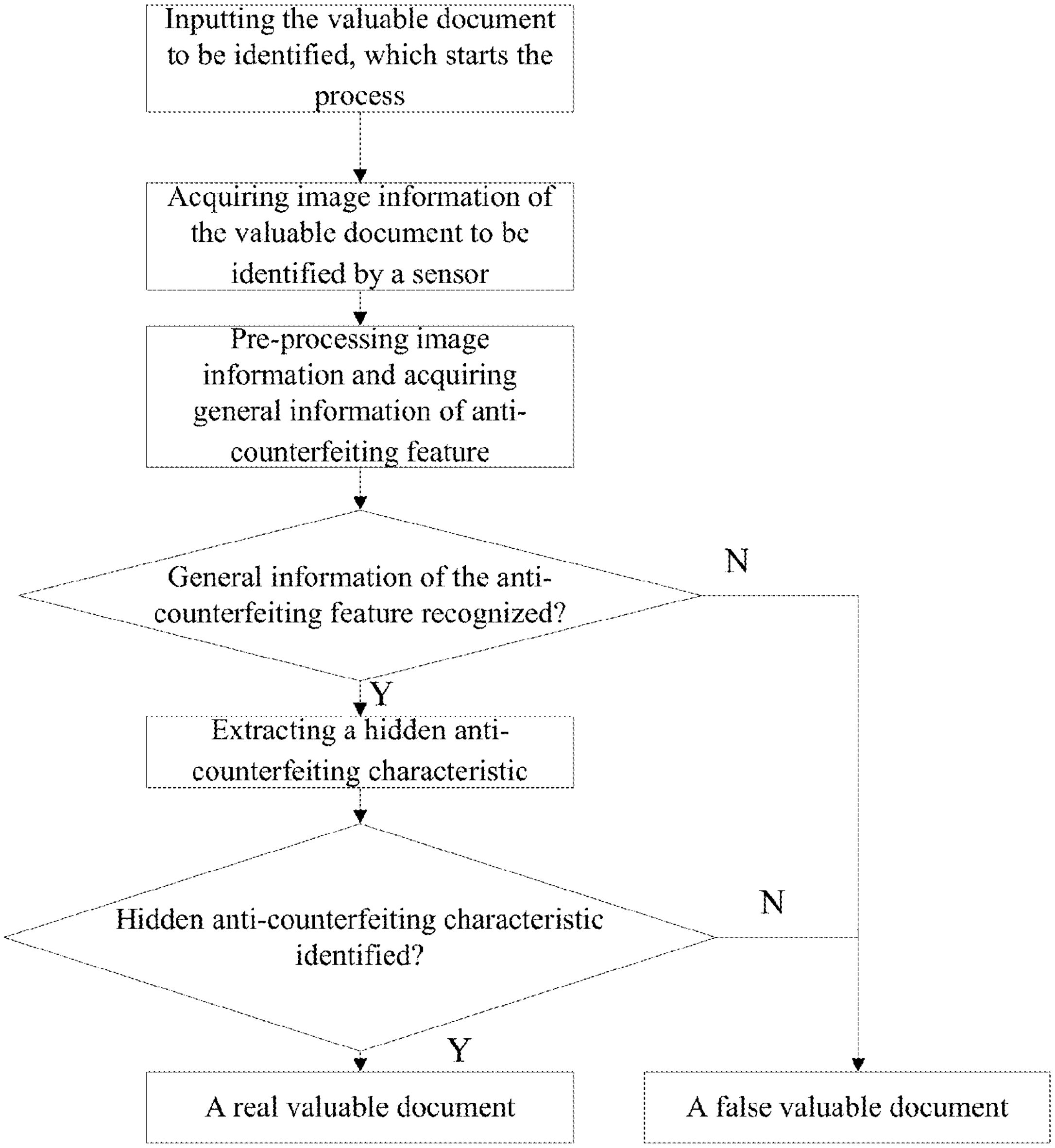
FIG. 7 is a flowchart of a method for identifying a valuable document provided according to an embodiment of the present invention.
Figure 8:
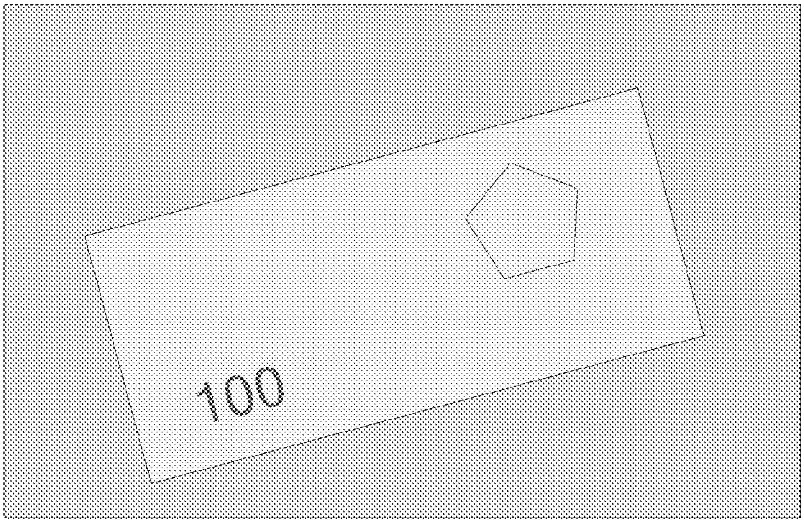
FIG. 8 is a diagram of an image captured by an optical sensor according to an embodiment of the present invention.
Figure 9:
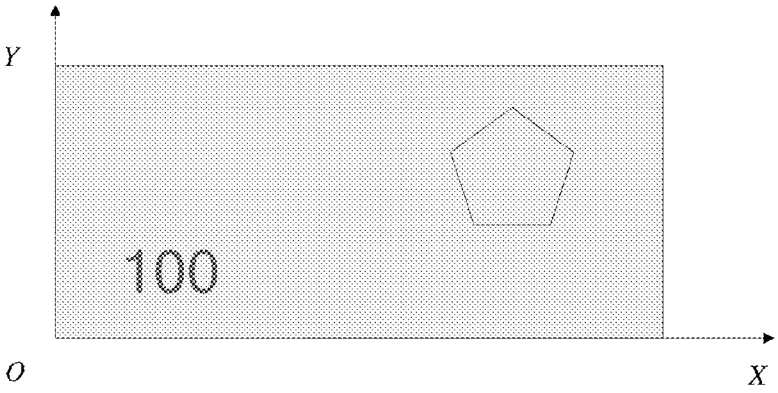
FIG. 9 shows a status in which an effective image of a valuable document is placed in a coordinate system, according to an embodiment of the present invention.

As illustrated in FIG. 7, the specific operating process of the method for identifying a valuable document provided in the embodiment is as follows:

(1) inputting a valuable document to be identified, which starts the process;

(2) acquiring image information of the valuable document to be identified by a sensor, as illustrated in FIG. 8;

(3) pre-processing a signal, in which general information of the anti-counterfeiting feature is acquired by cutting out an effective region of the current valuable document from a background region using the existing image cutting technologies, and placing an image of the current medium in a coordinate system XOY with a lower-left vertex of the image of the current medium being a coordinate origin, a line where a left edge locates being a longitudinal coordinate and a line where a lower edge locates being a horizontal coordinate.

Figure 10:
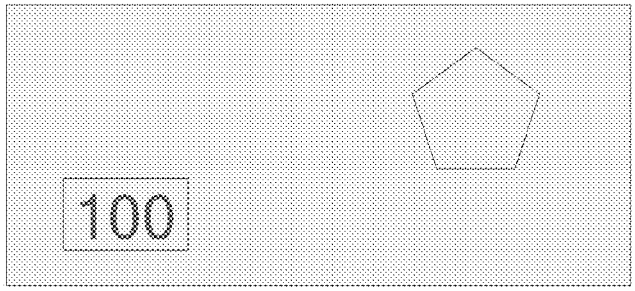
FIG. 10 illustrates the specific position of a number in optically variable ink showing a denomination as the anti-counterfeiting feature on a valuable document according to an embodiment of the present invention.
Figure 11:
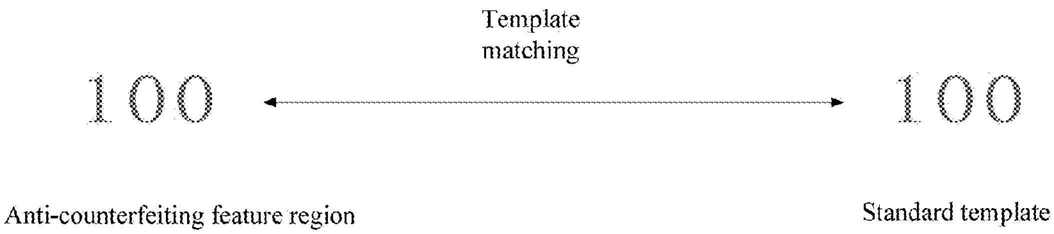
FIG. 11 is a schematic diagram illustrating matching and recognizing an anti-counterfeiting feature according to an embodiment of the present invention.

(4) taking a region bounded by blue lines in FIG. 10 as an anti-counterfeiting feature region, performing a template matching between the general information of the medium anti-counterfeiting feature in the spatial domain and standard data stored in a storage unit as illustrated in FIG. 11, if template matching fails, determining the current medium to be recognized as an illegal valuable document, and if template matching is successful, proceeding to the following step:

(5) extracting a hidden anti-counterfeiting characteristic and performing accurate identification on the anti-counterfeiting feature in the frequency domain, where $f_3(x, y)$ represents a pixel matrix in the spatial domain of an image of a number in the anti-counterfeiting feature region in FIG. 10, a wavelet transform the same as that used in the generating of the anti-counterfeiting feature is performed on $f_3(x, y)$, and $W[f_3]=R_3$, and the following equation is obtained:

$$R_3 = \begin{bmatrix} H_3H_3 & H_3L_3 \\ H_3L_3 & L_3L_3 \end{bmatrix} \quad \text{(Equation 2)}$$

According to the generating process of the anti-counterfeiting feature, coefficients contained in the coefficient matrix $H_3H_3$ in Equation 2 present a strong similarity to those coefficients contained in the coefficient matrix $L_2L_2$ in Equation 1. The coefficients contained in $H_3H_3$ may be arranged as a one-dimensional data sequence:

$$h=[h_1,h_2, \ldots ,h_n];$$

and the coefficients contained in $L_2L_2$ may be arranged as a one-dimensional data sequence:

$$l=[l_1,l_2, \ldots ,l_n].$$

The similarity $K_1$ between the data sequences $h=[h_1, h_2, \ldots, h_n]$ and $l=[l_1, l_2, \ldots, l_n]$ is detected based on a similarity determining criterion such as correlation coefficient method, and if the similarity $K_1$ is greater than a predetermined threshold K (preferably K=0.8 in the present invention), the anti-counterfeiting feature identifying is successful and the currently inputted medium is identified to be real; otherwise, the currently inputted medium is identified to be false and is rejected.

In the embodiment, the anti-counterfeiting feature is rebuilt and added onto the valuable document. When a real time counterfeit-identifying is performed on the valuable document, an accurate detecting is performed on the anti-counterfeiting characteristic of the anti-counterfeiting feature in the frequency domain to counterfeit-identify and recognize the valuable document accurately.

Third Section: An Apparatus for Identifying a Valuable Document

Figure 6:
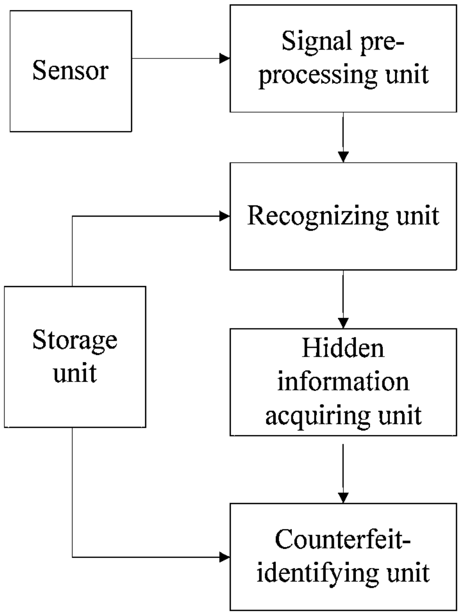
FIG. 6 is a structural diagram of an apparatus for identifying a valuable document provided according to an embodiment of the present invention.

A structural diagram of the apparatus for identifying a valuable document provided in the embodiment is illustrated in FIG. 6, which includes: a sensor which is adapted to acquire information on an anti-counterfeiting feature of a medium to be recognized; a signal pre-processing unit which pre-processes the information on the anti-counterfeiting feature, acquires general information of the anti-counterfeiting feature, and prepare for hidden information extraction and counterfeit-identifying; a storage unit which stores standard data for the general information and hidden information of the anti-counterfeiting feature needed for recognizing the medium; a hidden information acquiring unit which transforms pre-processed information, so as to extract the hidden information; and an counterfeit-identifying unit which compares the hidden information and the general information with respective standard data and outputs an identified result.

The apparatus for identifying a valuable document is configured in a financial self-service device, so that the financial self-service device can read the machine-readable anti-counterfeiting feature for the valuable document and an identifying precision of the financial self-service device for the valuable document is improved.

The above described are only the preferred embodiments of the present invention. It should be noted that any changes and modifications made without deviating the principle of the present invention fall in the claimed scope of protection of the present invention.

The invention claimed is:

1. A method for generating an anti-counterfeiting feature for a valuable document, comprising:

step one, scanning an original anti-counterfeiting feature M on the valuable document by a sensor, to obtain $M_1$ composed of partial information $M_{10}$ sensitive for human perception and partial information $M_{11}$ insensitive for human perception, and setting $M_2$ to denote accurate anti-counterfeiting characteristic information of the original anti-counterfeiting feature M that is not obtainable by the sensor, $M_2$ being composed of partial information $M_{20}$ sensitive for human perception and partial information $M_{21}$ insensitive for human perception, wherein M is an image of a number in optically variable ink showing a denomination, $M_1$ is a pixel matrix $f_1(x, y)$ in the spatial domain representing the image of the number in optically variable ink showing the denomination as perceived by a human eye when the valuable document is viewed at a right angle, and $M_2$ is a pixel matrix $f_2(x, y)$ in the spatial domain representing the image of the number in optically variable ink showing the denomination as perceived by the human eye when the valuable document is viewed at a non-right angle;

step two, performing a wavelet transform W on the pixel matrixes for frequency-domain transform:

$$W[f_1]=R_1,$$

$$W[f_2]=R_2$$

where $$R_1 = \begin{bmatrix} H_1H_1 & H_1L_1 \\ H_1L_1 & L_1L_1 \end{bmatrix} \text{ and } R_2 = \begin{bmatrix} H_2H_2 & H_2L_2 \\ H_2L_2 & L_2L_2 \end{bmatrix},$$

$R_1$ and $R_2$ represent frequency-domain coefficient matrixes obtained from the wavelet transform on $f_1(x, y)$ and $f_2(x, y)$ respectively, $H_1H_1$ in $R_1$ represents a highest-frequency coefficient and $L_2L_2$ in $R_2$ represents a lowest-frequency coefficient;

step three, substituting $L_2L_2$ in $R_2$ for $H_1H_1$ in $R_1$, and obtaining the following equation:

$$R_1' = \begin{bmatrix} L_2L_2 & H_1L_1 \\ H_1L_1 & L_1L_1 \end{bmatrix}$$

and performing an inverse M of the wavelet transform W on $R_1$':

$$M_R = M(R_1') = M\left(\begin{bmatrix} L_2L_2 & H_1L_1 \\ H_1L_1 & L_1L_1 \end{bmatrix}\right),$$

so as to inverse the wavelet coefficient matrix $R_1$' to a pixel matrix $M_R$ in the spatial domain; and step four, adding the pixel matrix $M_R$ in the spatial domain onto the valuable document and generating the anti-counterfeiting feature.

2. A method for identifying an anti-counterfeiting feature for a valuable document, comprising:

extracting a hidden anti-counterfeiting characteristic of the valuable document and performing accurate identification on the anti-counterfeiting feature of the valuable document, wherein a wavelet transform W is performed on a pixel matrix $f_3(x, y)$ in the spatial domain of an image of a number in a region of the anti-counterfeiting feature, $W[f_3]=R_3$, and the following equation is obtained:

$$R_3 = \begin{bmatrix} H_3H_3 & H_3L_3 \\ H_3L_3 & L_3L_3 \end{bmatrix} \quad \text{(Equation 2)}$$

wherein an original anti-counterfeiting feature M on a real valuable document is scanned by a sensor, to obtain $M_1$ composed of partial information $M_{10}$ sensitive for human perception and partial information $M_{11}$ insensitive for human perception, and $M_2$ is set to denote accurate anti-counterfeiting characteristic information of the original anti-counterfeiting feature M that is not obtainable by the sensor, $M_2$ being composed of partial information $M_{20}$ sensitive for human perception and partial information $M_{21}$ insensitive for human perception, wherein M is an image of a number in optically variable ink showing a denomination, $M_1$ is a pixel matrix $f_1(x, y)$ in the spatial domain representing the image of the number in optically variable ink showing the denomination as perceived by a human eye when the real valuable document is viewed at a right angle, and $M_2$ is a pixel matrix $f_2(x, y)$ in the spatial domain representing the image of the number in optically variable ink showing the denomination as perceived by the human eye when the real valuable document is viewed at a non-right angle;

the wavelet transform W is performed on the pixel matrixes $f_1(x, y)$ and $f_2(x, y)$ for frequency-domain transform:

$$W[f_1]=R_1,$$

$$W[f_2]=R_2$$

wherein $$R_1 = \begin{bmatrix} H_1H_1 & H_1L_1 \\ H_1L_1 & L_1L_1 \end{bmatrix} \text{ and } R_2 = \begin{bmatrix} H_2H_2 & H_2L_2 \\ H_2L_2 & L_2L_2 \end{bmatrix},$$

$R_1$ and $R_2$ represent frequency-domain coefficient matrixes obtained from the wavelet transform on $f_1(x, y)$ and $f_2(x, y)$ respectively, $H_1H_1$ in $R_1$ represents a highest-frequency coefficient and $L_2L_2$ in $R_2$ represents a lowest-frequency coefficient;

$L_2L_2$ in $R_2$ substitutes for $H_1H_1$ in $R_1$, and the following equation is obtained:

$$R_1' = \begin{bmatrix} L_2L_2 & H_1L_1 \\ H_1L_1 & L_1L_1 \end{bmatrix}$$

and an inverse M of the wavelet transform W is performed on $R_1$':

$$M_R = M(R_1') = M\left(\begin{bmatrix} L_2L_2 & H_1L_1 \\ H_1L_1 & L_1L_1 \end{bmatrix}\right),$$

so as to inverse the wavelet coefficient matrix $R_1$' to a pixel matrix $M_R$ in the spatial domain; and the pixel matrix $M_R$ in the spatial domain is added onto the real valuable document;

coefficients contained in the coefficient matrix $H_3H_3$ present a strong similarity to those coefficients contained in the coefficient matrix $L_2L_2$, the coefficients contained in $H_3H_3$ are arranged as a one-dimensional data sequence: $h=[h_1, h_2, \ldots, h_n]$;

and the coefficients contained in $L_2L_2$ are arranged as a one-dimensional data sequence: $l=[l_1, l_2, \ldots, l_n]$, similarity K1 between the data sequences $h=[h_1, h_2, \ldots, h_n]$ and $l=[l_1, l_2, \ldots, l_n]$ is detected based on a similarity determining criterion, and if K1 is greater than a predetermined threshold K, the valuable document is identified to be real; otherwise, the valuable document is identified to be false and is rejected.

3. An apparatus for identifying an anti-counterfeiting feature for a valuable document, comprising at least one processor and a memory having processor-executable instructions stored therein, and the instructions when executed by the at least one processor, configure the apparatus to extract a hidden anti-counterfeiting characteristic of the valuable document and perform accurate identification on the anti-counterfeiting feature of the valuable document, wherein a wavelet transform W is performed on a pixel matrix $f_3(x, y)$ in the spatial domain of an image of a number in a region of the anti-counterfeiting feature, $W[f_3]=R_3$, and the following equation is obtained:

$$R_3 = \begin{bmatrix} H_3H_3 & H_3L_3 \\ H_3L_3 & L_3L_3 \end{bmatrix},$$

wherein an original anti-counterfeiting feature M on a real valuable document is scanned by a sensor, to obtain $M_1$ composed of partial information $M_{10}$ sensitive for human perception and partial information $M_{11}$ insensitive for human perception, and $M_2$ is set to denote accurate anti-counterfeiting characteristic information of the original anti-counterfeiting feature M that is not obtainable by the sensor, $M_2$ being composed of partial information $M_{20}$ sensitive for human perception and partial information $M_{21}$ insensitive for human perception, wherein M is an image of a number in optically variable ink showing a denomination, $M_1$ is a pixel matrix $f_1(x, y)$ in the spatial domain representing the image of the number in optically variable ink showing the denomination as perceived by a human eye when the real valuable document is viewed at a right angle, and $M_2$ is a pixel matrix $f_2(x, y)$ in the spatial domain representing the image of the number in optically variable ink showing the denomination as perceived by the human eye when the real valuable document is viewed at a non-right angle;

the wavelet transform W is performed on the pixel matrixes $f_1(x, y)$ and $f_2(x, y)$ for frequency-domain transform:

$$W[f_1]=R_1,$$

$$W[f_2]=R_2$$

wherein $$R_1 = \begin{bmatrix} H_1H_1 & H_1L_1 \\ H_1L_1 & L_1L_1 \end{bmatrix}, \text{ and } R_2 = \begin{bmatrix} H_2H_2 & H_2L_2 \\ H_2L_2 & L_2L_2 \end{bmatrix},$$

$R_1$ and $R_2$ represent frequency-domain coefficient matrixes obtained from the wavelet transform on $f_1(x, y)$ and $f_2(x, y)$ respectively, $H_1H_1$ in $R_1$ represents a highest-frequency coefficient and $L_2L_2$ in $R_2$ represents a lowest-frequency coefficient;

$L_2L_2$ in $R_2$ substitutes for $H_1H_1$ in $R_1$, and the following equation is obtained:

$$R_1' = \begin{bmatrix} L_2L_2 & H_1L_1 \\ H_1L_1 & L_1L_1 \end{bmatrix}$$

and an inverse M of the wavelet transform W is performed on $R_1'$:

$$M_R = M(R_1') = M\left(\begin{bmatrix} L_2L_2 & H_1L_1 \\ H_1L_1 & L_1L_1 \end{bmatrix}\right),$$

so as to inverse the wavelet coefficient matrix $R_1'$ to a pixel matrix $M_R$ in the spatial domain; and the pixel matrix $M_R$ in the spatial domain is added onto the real valuable document;

coefficients contained in the coefficient matrix $H_3H_3$ present a strong similarity to those coefficients contained in the coefficient matrix $L_2L_2$, the coefficients contained in $H_3H_3$ are arranged as a one-dimensional data sequence: $h=[h_1, h_2, \ldots, h_n]$;

and the coefficients contained in $L_2L_2$ are arranged as a one-dimensional data sequence: $l=[l_1, l_2, \ldots, l_n]$, similarity K1 between the data sequences $h=[h_1, h_2, \ldots, h_n]$ and $l=[l_1, l_2, \ldots, l_n]$ is detected based on a similarity determining criterion, and if K1 is greater than a predetermined threshold K, the valuable document is identified to be real; otherwise, the valuable document is identified to be false and is rejected.

* * * * *